United States Patent
Vincent (10) Patent No.: US 7,277,997 B2
(45) Date of Patent: Oct. 2, 2007

(54) DATA CONSISTENCY FOR MIRRORING UPDATABLE SOURCE DATA STORAGE

(75) Inventor: Pradeep Vincent, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/803,815

(22) Filed: Mar. 16, 2004

(65) Prior Publication Data

US 2005/0210320 A1    Sep. 22, 2005

(51) Int. Cl.
G06F 12/00  (2006.01)

(52) U.S. Cl. ..................................... 711/162
(58) Field of Classification Search ............ None
See application file for complete search history.

(56) References Cited

U.S. PATENT DOCUMENTS

| | | | |
|---|---|---|---|
| 6,324,654 B1 | 11/2001 | Wahl et al. ........................ 714/6 |
| 6,502,205 B1 | 12/2002 | Yanai et al. ...................... 714/7 |
| 6,543,001 B2 | 4/2003 | LeCrone et al. ................. 714/6 |
| 6,549,992 B1 | 4/2003 | Armangau et al. ........... 711/162 |
| 6,611,901 B1* | 8/2003 | Micka et al. .................. 711/162 |
| 7,000,145 B2* | 2/2006 | Werner et al. .................. 714/20 |
| 7,120,769 B2* | 10/2006 | Yagawa et al. ............... 711/162 |
| 2001/0047412 A1 | 11/2001 | Weinman, Jr. ................ 709/225 |
| 2002/0069369 A1 | 6/2002 | Tremain ........................ 713/201 |
| 2002/0152362 A1 | 10/2002 | Cochran ....................... 711/162 |
| 2002/0199058 A1 | 12/2002 | Ofek .............................. 711/112 |
| 2003/0005355 A1 | 1/2003 | Yanai et al. ...................... 714/7 |
| 2003/0014523 A1 | 1/2003 | Teloh et al. ................... 709/226 |
| 2003/0028723 A1 | 2/2003 | Segev et al. ................... 711/113 |
| 2003/0056038 A1 | 3/2003 | Cochran ......................... 710/36 |
| 2003/0061399 A1 | 3/2003 | Wagener et al. .............. 709/321 |
| 2003/0061456 A1 | 3/2003 | Ofek et al. ..................... 711/162 |
| 2003/0074600 A1 | 4/2003 | Tamatsu .......................... 714/6 |
| 2004/0193816 A1* | 9/2004 | Meiri et al. .................... 711/162 |
| 2004/0260898 A1* | 12/2004 | Stanley et al. ............... 711/162 |
| 2004/0260899 A1* | 12/2004 | Kern et al. .................... 711/162 |
| 2006/0085610 A1* | 4/2006 | Iwamura et al. .............. 711/162 |

FOREIGN PATENT DOCUMENTS

EP    1647891 A2 *    4/2006

* cited by examiner

Primary Examiner—Matthew Kim
Assistant Examiner—Ryan A. Dare
(74) Attorney, Agent, or Firm—John H. Holcombe (57) ABSTRACT

An information handling system for mirroring data, in a fashion that is similar to asynchronous mirroring, but less complex in function. Source data storage for storing and updating data is provided, with first intermediate data storage, target data storage, second intermediate data storage, and mirroring control. The mirroring control conducts first cyclic incremental flashcopy of the source data storage, the beginning of each first cyclic incremental flashcopy comprising a consistency point. The first cyclic incremental flashcopy comprises copying data to be mirrored to the first intermediate storage and synchronously mirroring the data to the second intermediate data storage. A second cyclic incremental flashcopy of the second intermediate data storage is conducted to the target data storage, the second cyclic incremental flashcopy beginning in response to completion of the first cyclic incremental flashcopy; the beginning of the second cyclic incremental flashcopy comprising commit of the consistency point.

22 Claims, 8 Drawing Sheets

FIG. 1

Time t1  FIG. 2A

Time t2  FIG. 2B

DATA CONSISTENCY FOR MIRRORING UPDATABLE SOURCE DATA STORAGE

FIELD OF THE INVENTION

This invention relates to mirroring of data storage in an information handling system, and, more particularly, to mirroring in a fashion that is similar to asynchronous mirroring.

BACKGROUND OF THE INVENTION

Asynchronous mirroring is a popular way of duplicating data storage, for example, for the purpose of disaster recovery. Synchronous mirroring requires that data be stored by both a source and a target data storage before the storage transaction is considered complete. Asynchronous mirroring requires that the data first is stored by the source data storage, and that it will ultimately be stored at the target data storage, and that safeguards are in place to insure that the data can be tracked. Asynchronous mirroring allows the host or immediate source of the data to consider the storage transaction complete when the data is first stored by the source data storage. The asynchronous mirroring system then ultimately stores the data at the target data storage. As the result, implementation of asynchronous mirroring is much more complex than synchronous mirroring.

It is advantageous for disaster recovery to have the duplicated data storage at a site or location remote from that of the source data storage. The time required for distant verified communication of the data may be considerable, especially if large numbers of blocks or files (called "grains") are to be mirrored. As the result, asynchronous mirroring is preferable from a time standpoint as compared to synchronous mirroring which requires actual storage by both a source and a target data storage before each storage transaction is considered complete.

SUMMARY OF THE INVENTION

The present invention comprises an information handling system, a computer program product, a method, and a mirroring controller for mirroring in a fashion that is similar to asynchronous mirroring, but less complex in function, such as employing synchronous mirroring.

In one embodiment, an information handling system for mirroring data comprises:

source data storage for storing and updating data;
first intermediate data storage for storing data, the first intermediate data storage associated with the source data storage;
target data storage for storing data;
second intermediate data storage for storing data, the second intermediate data storage associated with the target data storage; and
mirroring control conducting first cyclic incremental flashcopy of the source data storage to the first intermediate data storage, the beginning of each first cyclic incremental flashcopy comprising a consistency point, the first cyclic incremental flashcopy synchronously mirrored to the second intermediate data storage; and conducting a second cyclic incremental flashcopy of the second intermediate data storage to the target data storage, the second cyclic incremental flashcopy beginning in response to completion of the first cyclic incremental flashcopy; the beginning of the second cyclic incremental flashcopy comprising commit of the consistency point.

"Incremental flashcopy" is an improvement to backup sidefiles. With backup sidefiles, when a data file is to be updated before it can be physically copied to a target, entries are made to a "sidefile", for example in cache memory, to capture modifications or to preserve a previous data image, and the new data may then update the original data in the source file. Once backup copies have been made of the data, the sidefile entries are erased. In the present invention, incremental flashcopy is a repeating occurrence, additionally tracking the grains that have been modified in the source data storage after the initiation of the present flashcopy.

In a further embodiment, the information handling system comprises source data storage for storing and updating data; first intermediate data storage for storing data; and mirroring control conducting first cyclic incremental flashcopy of the source data storage, the beginning of each first cyclic incremental flashcopy comprising a consistency point. The first cyclic incremental flashcopy is synchronously mirrored to the first intermediate data storage and to a second intermediate data storage for storing data; and, in a loop, the mirroring control initiates another first cyclic incremental flashcopy of the source data storage in response to a commit of the consistency point; wherein the commit of the consistency point comprises the beginning of a second cyclic incremental flashcopy of the second intermediate data storage to a target data storage, the second cyclic incremental flashcopy beginning in response to completion of the first cyclic incremental flashcopy.

In a still further embodiment, the mirroring control additionally responds to an update write for the source data storage, determining whether data of the source data storage to be overwritten by the update write is present at the first intermediate data storage and the synchronously mirrored second intermediate data storage. If so, the mirroring control allows the update write to be written to the source data storage, and indicates the update write in a future flashcopy map.

In another embodiment, the future flashcopy map of the mirroring control is employed for conducting the next first cyclic incremental flashcopy of the source data storage.

In still another embodiment, the first cyclic incremental flashcopy conducted by the mirroring control employs a first flashcopy map indicating required, and not completed, mirroring of grains of the source data storage, and, in response to completion of mirroring of the grains indicated by the first flashcopy map and the commit of the consistency point, the mirroring control updates the first flashcopy map with the future flashcopy map.

In a further embodiment, the first cyclic incremental flashcopy conducted by the mirroring control employs a first flashcopy map indicating required, and not completed, mirroring of grains of the source data storage, and the mirroring control merges the first flashcopy map with the future flashcopy map to generate a new first flashcopy map, and resets the future flashcopy map; the beginning of the new first cyclic incremental flashcopy comprising a consistency point.

In another embodiment, wherein the target data storage and the second intermediate data storage are remotely located with respect to a locally located source data storage and first intermediate data storage; the information handling system additionally comprises at least one interface at the target data storage and the second intermediate data storage for interfacing the mirroring control and the source data storage with at least one communication system for communicating between the remote and local locations.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
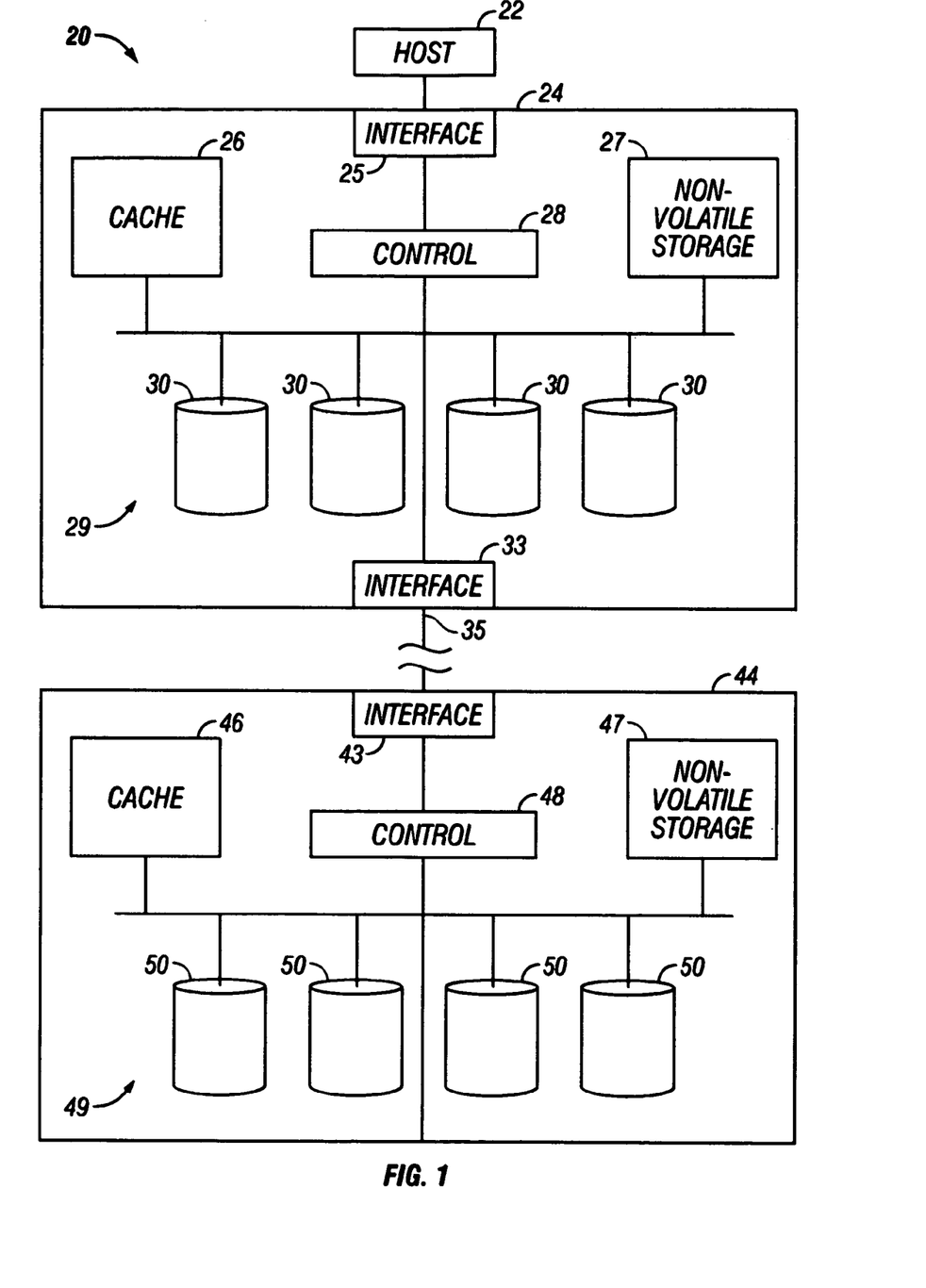
FIG. 1 is a block diagram of an embodiment of an information handling system in accordance with the present invention.

FIG. 1 illustrates an information handling system 20 for, inter alia, mirroring data, in accordance with an embodiment of the present invention. A first data storage system 24 is in communication with a host system 22, and comprises the source data storage, and is in further communication with a second data storage system 44, which comprises the target data storage, and may be located remotely from the first data storage system 24, for example, for disaster recovery. The host system 22 may comprise a single data processing system, or a network of processing systems, etc., and provide the data for storage and mirroring, and request storage and/or retrieval of the data, e.g., at an interface 25 of the first data storage system 24. Each of the first data storage system 24 and the second data storage system 44 may also be considered an information handling system.

An example of a first data storage system 24 and of the second data storage system 44 comprises an IBM Enterprise Storage Server (ESS), sold by the IBM Corporation. The first data storage system 24 and the second data storage system 44 may be similar or identical information handling systems, or may comprise differing systems having a common communication protocol, and are in communication with each other via interfaces 33 and 43, respectively, and a communication link 35. Examples of communication protocol comprise ESCON, SCSI, Fibre Channel, etc., as is known to those of skill in the art. For the purpose of disaster recovery, the first data storage system 24 and the second data storage system 44 are best located remotely from one another, for example, in different cities, or even different continents. The communication link 35 between the first data storage system 24 and the second data storage system 44 may therefore be commercially available long distance high speed data links.

The first data storage system 24 and the second data storage system 44 each comprises a controller 28 and 48, respectively, having a cache memory 26 and 46, and a nonvolatile storage 27 and 47. The controller may be implemented as one or more microprocessors comprising a programmable computer processor usable with a computer program product having computer readable code embodied therein. Mirroring control may be implemented as a computer program product for the controller 28 and/or controller 48. The computer program product may be supplied from a network at interface 24, or by means of a machine readable media, such as optical disk or magnetic disk media or tape.

The cache memory 26 and 46 buffers data as it is received from the host system 22 or transferred within or between the first data storage system 24 and the second data storage system 44. The nonvolatile storage 27 and 47 may also store data, and stores data that is needed as potential backup in case of a power outage of the first data storage system 24 or of the second data storage system 44, such as bit maps, as will be discussed.

The controller 28 and controller 48 each operates a data storage 29 and 49 of data storage devices 30 and 50, respectively. The data storage may be arranged into various logical data storage units. For example, the data storage devices may be arranged as an array with logical data storage partially occupying all or some of the data storage devices. In the example of the IBM ESS, the data storage devices 30 and 50 comprise magnetic disk drives or arrays of magnetic disk drives. Similarly, the data storage devices 30 and 50 may comprise optical drives or arrays, or devices that have direct or random access characteristics.

Figure 2A:
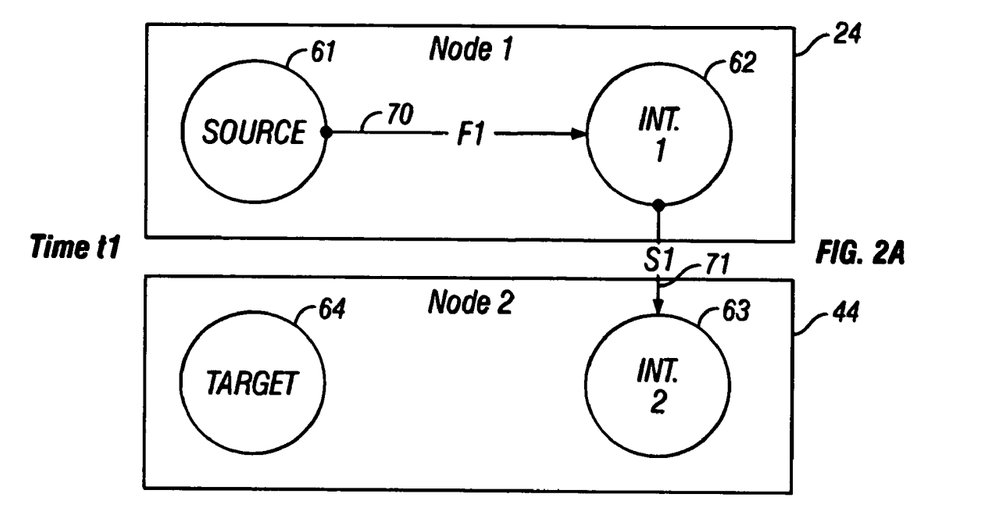
FIGS. 2A, 2B and 2C are schematic representations of the operation of the information handling system of FIG. 1.
Figure 2B:
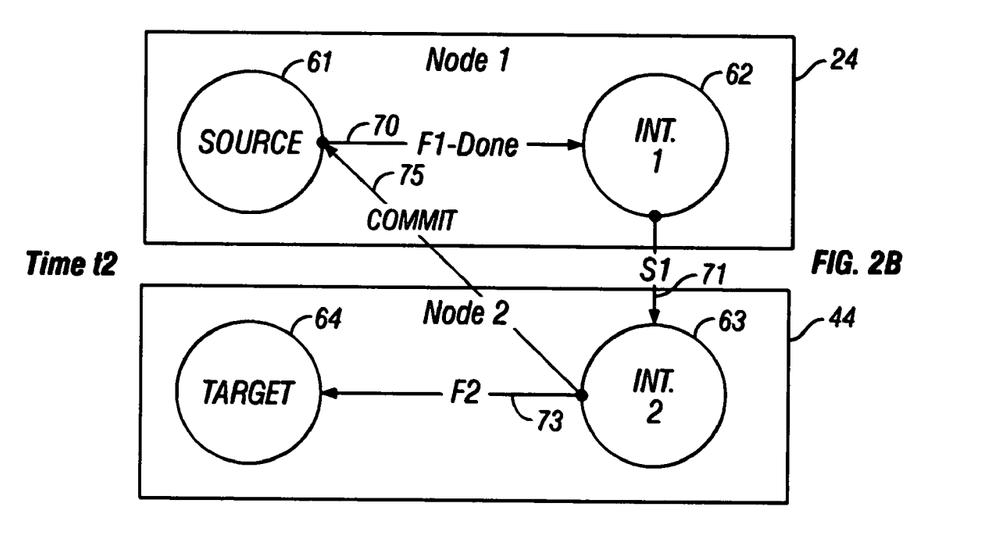
Figure 2C:
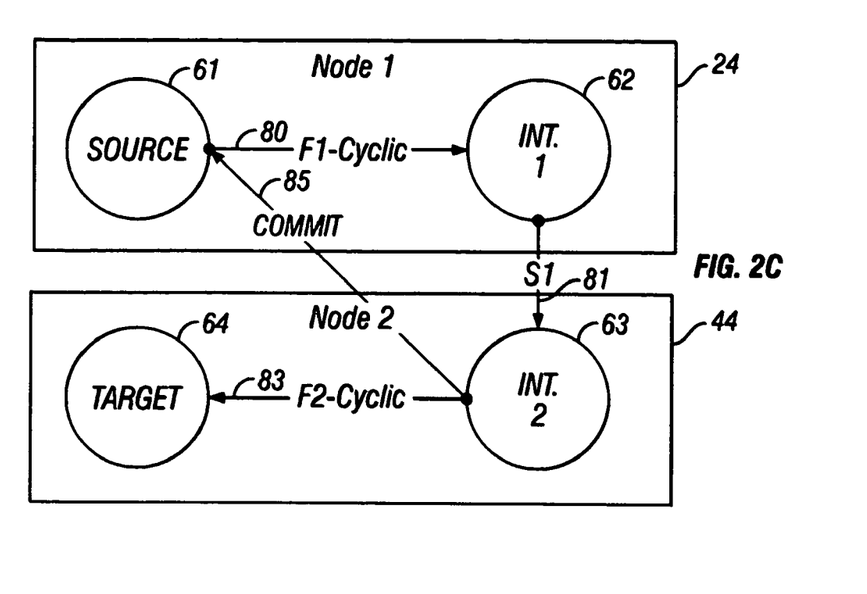

FIGS. 2A, 2B and 2C illustrate mirroring in accordance with an embodiment of the present invention. Source data storage 61 and first intermediate data storage 62 comprise logical data storage of the first data storage system 24, such that the first intermediate data storage 62 is associated with the source data storage 61. Target data storage 64 and second intermediate data storage 63 comprise logical data storage of the second data storage system 44, such that the second intermediate data storage 63 is associated with the target data storage 64.

An initial state of the mirroring process may be that no mirroring has occurred and that the entirety of source data is to be mirrored. In that initial process, the data to be mirrored is stored, or is in the process of being stored, to source data storage 61, and no mirrored data is stored to target data storage 64. Initially, the mirroring control of controller 28 of the first data storage system 24 conducts a first cyclic incremental flashcopy 70 of the source data storage, the beginning of each first cyclic incremental flashcopy comprising a consistency point, comprising the data to be mirrored as depicted at a time "t1", and synchronously mirrors 71 the first cyclic incremental flashcopy to the first intermediate data storage 62 and to the second intermediate data storage 63.

"Incremental flashcopy" is an improvement to backup sidefiles. With backup sidefiles, when a data file is to be updated before it can be physically copied to a target, entries are made to a "sidefile", for example in cache memory 26, 46 in FIG. 1, to capture modifications or to preserve a previous data image, and the new data may then update the original data in the source file. Once backup copies have been made of the data, the sidefile entries are erased.

In the present invention, referring to FIGS. 2A, 2B and 2C, incremental flashcopy is a repeating occurrence, additionally tracking the grains that have been modified in the source data storage after the initiation of the present flashcopy. Normal flashcopy tracks all the data that was at the source data storage when the flashcopy was started, and may be at the source data storage or at a backup. As a data grain is copied to a target, the flashcopy so indicates in a sidefile, and once the backup copies have been made of the data, the sidefile entries are erased.

Incremental flashcopy additionally tracks grains that have been modified in the source data storage after the initiation of the present flashcopy. The tracked modified data grains then comprises a future, or incremental, flashcopy, as will be discussed.

In the present invention, once a data grain has been copied to the first intermediate data storage 62 and synchronously copied to the second intermediate data storage 63 of the second data storage system 44, and a command complete has been received by the controller 28 of FIG. 1 to complete the synchronous copy of that grain, the grain may be modified or updated in the source data storage 61 of FIG. 2A. The original data of the grain is then available, if needed for backup, at the first intermediate data storage 62 and the second intermediate data storage 63.

Additionally referring to FIG. 2B, in response to completion of the first cyclic incremental flashcopy 70, such that the entirety of the data at the consistency point "t1" has been copied to the first intermediate data storage 62 and synchronously copied to the second intermediate data storage 63, the mirroring control of controller 48 of FIG. 1 conducts a second cyclic incremental flashcopy 73 of the second intermediate data storage 63 to the target data storage 64 of FIG. 2B, the beginning of the second cyclic incremental flashcopy comprising commit of the consistency point of the original mirrored data as depicted at time "t1". The commit of the consistency point is made at time "t2", and is communicated 75 over a communication link to the mirroring control of controller 28 of FIG. 1. The commit means that the entirety of the data at the consistency point "t1" has been copied to the second data storage system 44 of FIG. 2A and is available for data recovery if needed. Specifically, the data has been copied to the second intermediate data storage 63, and is being transferred to the target data storage 64.

At this point, referring to FIG. 2C, cyclic or continuous mirroring of the source data storage 61 is conducted. Modification or updates to grains of the source data storage 61 have been tracked by the first cyclic incremental flashcopy, and, at a new desired time, for example, in response to receipt, by mirroring control of controller 28, of the commit from the mirroring control of controller 48 of FIG. 1, the mirroring control of controller 28 conducts a new first cyclic incremental flashcopy 80 of the source data storage 61 of FIG. 2C, and again, the beginning of each first cyclic incremental flashcopy comprises a consistency point, comprising the data of grains tracked by the previous first cyclic incremental flashcopy that have been modified or updated and are to be mirrored, as depicted at a new time "t1", and copies the present first cyclic incremental flashcopy to the first intermediate data storage 62, synchronously mirroring 81 the data of the grains to the second intermediate data storage 63.

Also again, once a data grain has been copied to the first intermediate data storage 62 and synchronously mirrored to the second intermediate data storage 63 of the second data storage system 44, and a command complete has been received by the controller 28 of FIG. 1 to complete the synchronous copy, the grain may be modified or updated in the source data storage 61 of FIG. 2C. The new original data of the grain is then available, if needed for backup, at either the first intermediate data storage 62 or the second intermediate data storage 63.

In response to completion of the first cyclic incremental flashcopy 80, such that the entirety of the data grains at the new consistency point "t1" has been copied to the first intermediate data storage 62 and to the second intermediate data storage 63, the mirroring control of controller 48 of FIG. 1 conducts a second cyclic incremental flashcopy 83 of the second intermediate data storage 63 to the target data storage 64 of FIG. 2C, the beginning of the second cyclic incremental flashcopy comprising commit of the consistency point of the original mirrored data as depicted at new time "t1". The commit of the consistency point is made at new time "t2", and is communicated 85 over a communication link to the mirroring control of controller 28 of FIG. 1. The commit means that the entirety of the data of grains tracked by the previous first cyclic incremental flashcopy that have been modified or updated at the consistency point "t1" has been copied to the second data storage system 44 of FIG. 2C and is available for data recovery if needed. Specifically, the data has been copied to the second intermediate data storage 63, and is being transferred to the target data storage 64.

The cyclic operation of the present invention then continues, without the necessity of completing the second cyclic incremental flashcopy 83. For example, each time that a commit is made and data that has been modified or updated is being transferred to the target data storage 64, the tracking of the data grains that have been modified or updated from the immediately preceding cycle is updated with the identification of grains that have been modified or updated in the latest cycle.

In one embodiment, the first cyclic incremental flashcopy and synchronous mirroring of the data of the grains to be copied is conducted in an ordered fashion, for example, based on a sequence of access of the source data storage. In another embodiment, an update write for data of a grain whose present data has not yet been copied, causes the mirroring control 28 to immediately copy the present data of the grain to the first intermediate data storage 62 and synchronously mirror the data to the second intermediate data storage 63. Thus, the mirroring control 28 responds to an update write for the source data storage 61, determining whether data of the source data storage to be overwritten by the update write is present at the first intermediate data storage 61 and the synchronously mirrored second intermediate data storage. If so, the mirroring control 28 allows the update write to be written to the source data storage, and indicates the update write. If not, else, the mirroring control 28 immediately copies the present data of the grain to be overwritten to the first intermediate data storage 62, synchronously mirroring the data to the second intermediate data storage 63. Then, upon completion of the storage of the data at first intermediate data storage 62 and second intermediate data storage 63, the mirroring control 28 allows the update write to be written to the source data storage.

FIGS. 3, 4, 5 and 6 illustrate an embodiment for tracking the grains of data for an incremental flashcopy 80 or an incremental flashcopy 83, employing a bit map 90 and a future bit map 91. The bit maps are stored, for example, by the nonvolatile storage 27 and 47 of the data storage systems 24 and 44, respectively, of FIG. 1. In each of the FIGS. 3, 4, 5 and 6, a source data storage 61 and a first intermediate data storage 62 are illustrated, for example, as during a first cyclic incremental flashcopy 80. The data of the grains of the second intermediate data storage 63 are identical to those of the first intermediate data storage 62 because the data is synchronously copied to both.

The same bit maps are employed in the second cyclic incremental flashcopy 83 to copy data grains from the second intermediate data storage 63 to the target data storage 64.

The bit maps 90 and 91 are illustrated as logically ordered in the same order as data grains are stored in the data storages 61 and 62. Additionally, the data storages are illustrated as having the data stored in an ordered fashion. In the example, bit position 94 of bit map 90 represents grain 95 of data storage 62, and bit position 96 of future bit map 91 represents grain 97 of data storage 61. In fact, the data grains may be distributed throughout an array of the data storage devices 30 and/or 50 of FIG. 1, and the bit maps may be ordered in any fashion which provides an identification or representation of the data grains.

Figure 3:
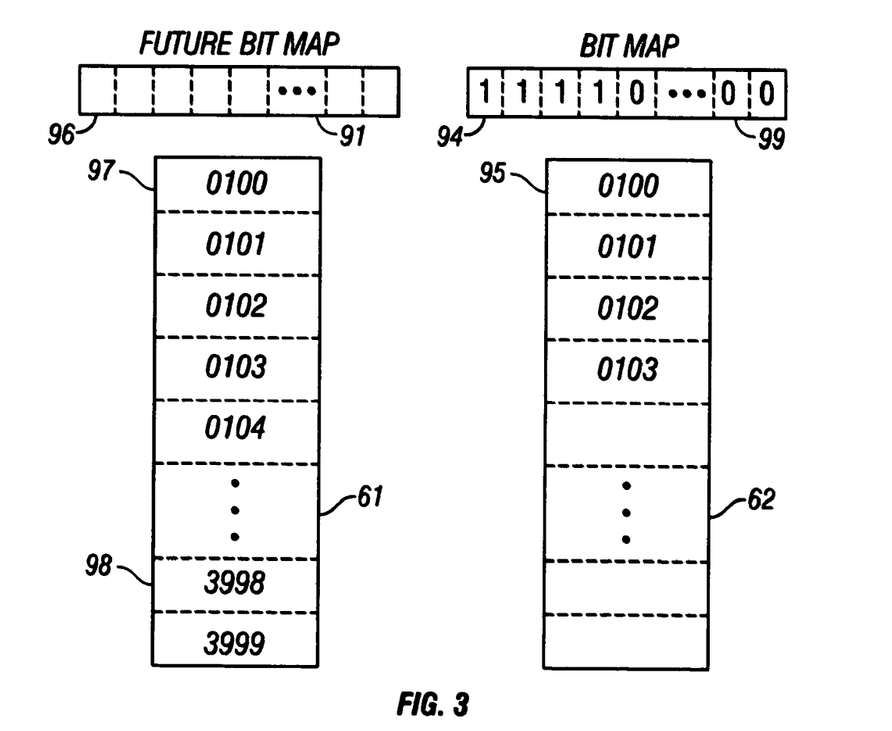
FIGS. 3, 4, 5 and 6 are schematic representations of data and of bit maps employed in accordance with an embodiment of the present invention.

FIG. 3 illustrates an incremental flashcopy, for example, during an initial state of the copying process when the data to be copied is stored, or is in the process of being stored to source data storage 61, and no data is stored to the flashcopy target data storage. Data storage 61 is illustrated as having all of the data to be copied, and data storage 62 is illustrated as beginning to be filled with copies of the data grains of data storage 61, while the remainder of data storage 62 is empty. In the example, data has been copied to data storage 62 to the point that data grain "0103" has just been copied. The bit map 90 reflects the state of the copying, and has a "0" at each bit position representing a grain that has not been copied, and has a "1" at each bit position representing a grain that has been copied. In the example, for the first incremental flashcopy 70, the bit representing a grain is "set" to "1" when the data of the grain is copied to the first intermediate data storage 62 and synchronously mirrored 71 to the second intermediate data storage 63 during the first cyclic incremental flashcopy 70 of FIG. 2A. Similarly, for the second incremental flashcopy 73, the bit representing a grain is "set" to "1" when the data of the grain is copied from the second intermediate data storage 63 to the target data storage 64 during the second incremental flashcopy 73 of FIG. 2B.

Thus, if there is a desire to access data grain 97, bit position 94 of bit map 90 indicates that the data is at grain 95 of data storage 62, and, if, instead, there is a desire to access data grain 98, bit position 99 of bit map 90 indicates that the data has not been copied and is at grain 98 of data storage 61.

Figure 4:
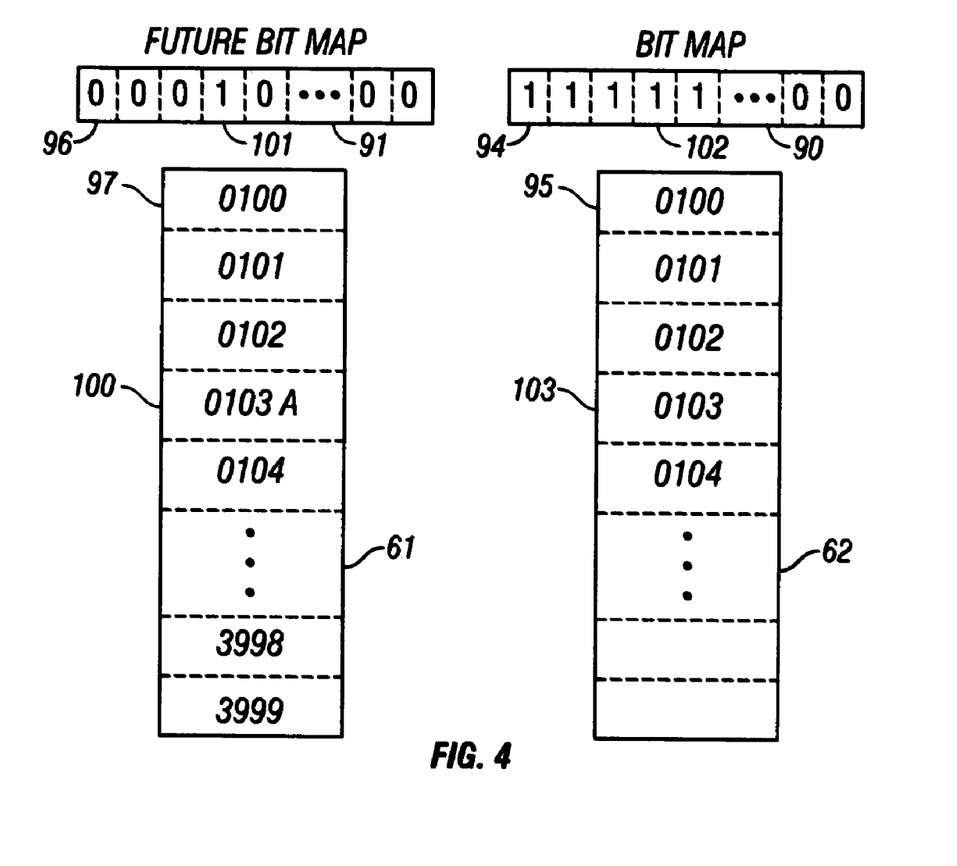

FIG. 4 illustrates the incremental flashcopy of FIG. 3, advanced to the point that data grain "0103" has been copied to data storage 62, and a modification or update has been made to the data grain, such that the data grain 100 now appears as data grain "0103A". Therefore, the bit 101 of the future bit map 91 representing grain 100 is set to "1". If there is a desire to access the original data of grain 100 before modification or update, bit position 102 of bit map 90 indicates that the data is at grain 103 of data storage 62, and, if, instead, there is a desire to access the updated data grain 100 after the original data has been copied and after the data has been modified or updated, bit position 101 of future bit map 91 and bit position 102 of bit map 90 indicate that the updated data is at grain 100 of data storage 61. The future bit map 91 only has a value after the original data has been copied and the data is modified later.

Figure 5:
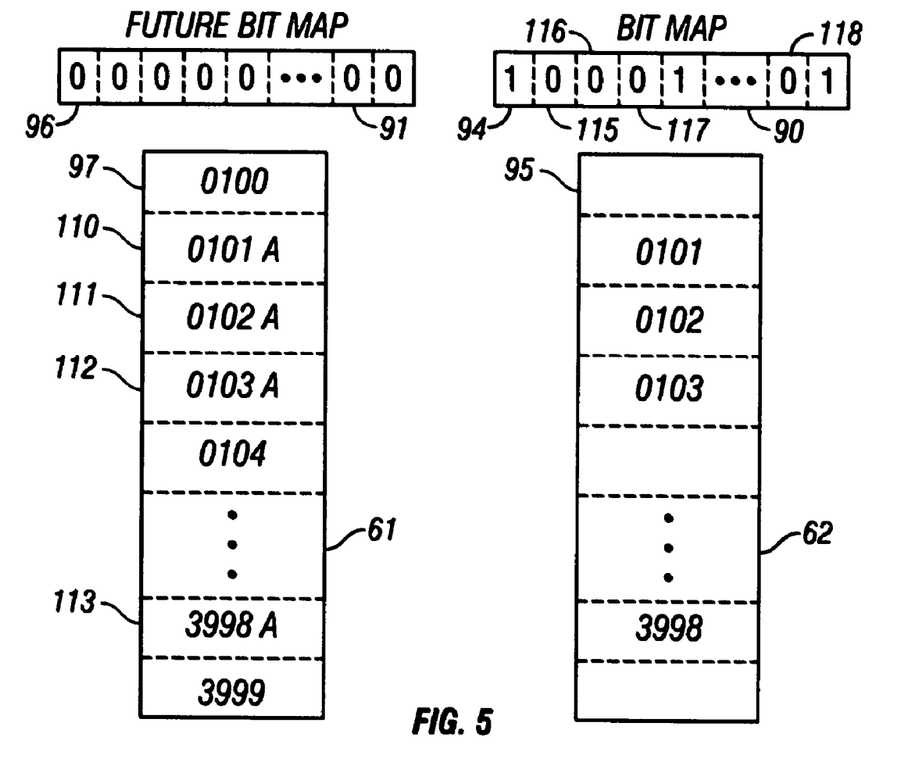

FIG. 5 illustrates an incremental flashcopy, for example, during a cyclic or continuous mirroring of the source data storage 61 with respect to target data storage 64. Data storage 61 is illustrated as having all of the original data excluding the data that has been modified or updated. The data at grains 110, 111, 112 and 113 has been modified or updated and is to be mirrored. First intermediate data storage 62 (and second intermediate data storage 63) is illustrated as having at least the original data that is to be replaced by the modified or updated data of data storage 61, while the remainder of data storage 62 may have the remaining original data before the most recent update. Thus, at the beginning of a cyclic mirroring, the data storage 62, 63 comprises the previous state of the mirrored data, at the consistency point to which a commit has been made. If any of the data storage 61, 62 is temporarily employed for other activities or destroyed, the original data will be found at target data storage 64 of FIG. 2.

In FIG. 4 and in FIG. 5, the bit map 90 must be updated to indicate the data to be copied from the source data storage 61 to the data storage 62. This comprises employing the future flashcopy map 91 of the mirroring control for conducting the next first cyclic incremental flashcopy of the source data storage.

In one embodiment, the first cyclic incremental flashcopy conducted by the mirroring control employs a first flashcopy map 90 indicating required, and not completed, mirroring of grains of the source data storage, as discussed above, and, in response to completion of mirroring of the grains indicated by the first flashcopy map and the commit of the consistency point, the mirroring control updates the first flashcopy map 90 with the future flashcopy map 91.

In one example, at completion of the mirroring of the grains, the first flashcopy map is all "1", and the bits of the future flashcopy map 91 are inverted, and the future flashcopy map with the inverted bits becomes the first flashcopy map 90. Thus, the new first flashcopy bit map 90 indicates (e.g. as "0") only the grains that have been modified or updated and are to be mirrored. The bit positions of the grains that have not been modified or updated are inverted to "1", as is illustrated in FIG. 5. The data is thereby indicated as being the same at both the source data storage 61 and the intermediate data storage 62, 63 for the "1" bits of the new first flashcopy bit map 90.

In another example, which does not require that the previous mirroring of the grains be completed, the bits of the future flashcopy map 91 are "exclusive ORed" with the bits of the first flashcopy map 90 to form a new first flashcopy map 90. Alternatively, the first flashcopy map may be ANDed to NOT of the future flashcopy map. Any data grains that have been mirrored will have a "1" in bit map 90, any data grains that have not yet been mirrored will have a "0" in bit map 90. Any data grains that have been modified or updated will have a "1" in future flashcopy bit map, and those data grains will have a "1" in the first flashcopy map since they will have to have been successfully copied before the modification or update of the data grain in data storage 61. As the result of the "exclusive OR", data grains that have been modified or updated will have a "0" in the new first flashcopy map and will be copied; any data grains that had not been successfully mirrored will also have a "0" in the new first flashcopy map and will be copied; and any data grains that had been successfully mirrored and have not been updated or modified will have a "1" in the new first flashcopy map and will not be recopied.

FIG. 5 represents a first cyclic incremental flashcopy. The mirroring control previous future flashcopy bitmap has been applied to update the first flashcopy bitmap 90, as discussed above. In the example, the "0" at bit positions 115, 116, 117 and 118 indicate that the data at grains 110, 111, 112 and 113 has been modified or updated and is to be mirrored. The mirroring control then conducts the first cyclic incremental flashcopy of the source data storage for grains 110, 111, 112 and 113, the beginning of the first cyclic incremental flashcopy comprising a consistency point.

Figure 6:
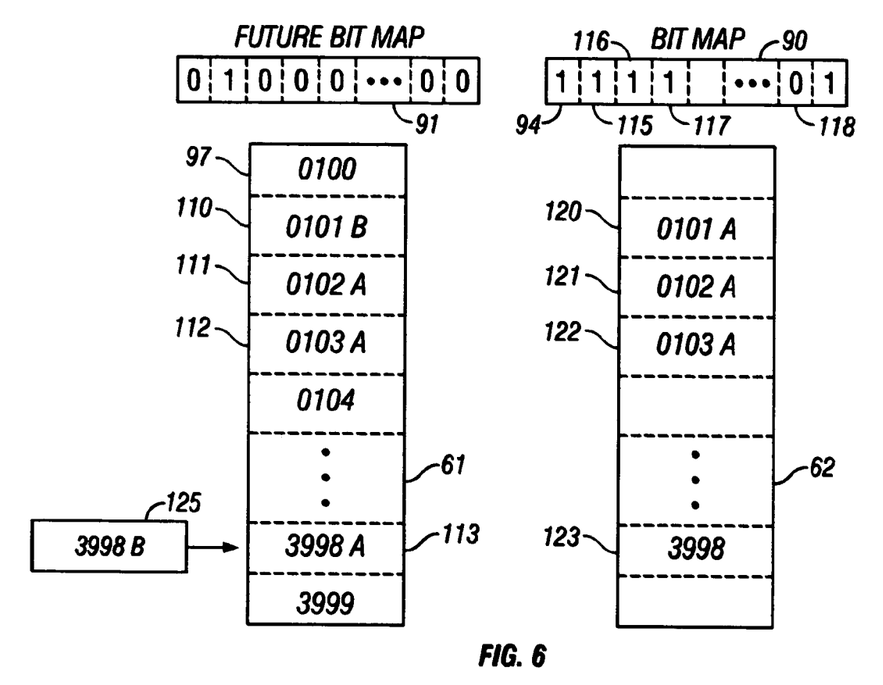

Referring to FIG. 6, the data of the source data storage 61 is being updated by an update write. The mirroring control determines whether data of the data storage 61 to be overwritten by the update write is present at the data storage 62, in the example, by consulting the bit map 90. If the previous data (which is to be overwritten) has been copied and is at the data storage 62, the mirroring control allows the update write to be written to the data storage 61, and indicates the update write in a future flashcopy map 91. In the example, the data to be mirrored of grains 110, 111 and 112 of data storage 61 has been copied to grains 120, 121 and 122 of data storage 62, as indicated by bits 115, 116 and 117 of bit map 90, and thus the update write to grain 110 can be conducted.

In one embodiment, else, meaning that the previous data (which is to be overwritten) has not been copied to the source data storage 62, the mirroring control immediately copies the present data of the source data storage 61 to be overwritten to data storage 62, and then allows the update write to be written to the source data storage 61, and indicates the update write in the future flashcopy map 91. If the copying is immediate to allow an immediate update write, the action is called a "Copy on Write" or "COW". In the example, the data of grain 113 has not been copied to data storage 62, as indicated by the "0" of bit 118 of bit map 90. Thus, the mirroring control copies the data of grain 113 the data storage 61 to be overwritten to data storage 62, changes bit 118 of bit map 90 to a "1" to indicate that the data has been copied, and allows the update write of data 125 to be written to grain 113 of the data storage 61, and indicates the update write in the future flashcopy map 91. Alternatively, the update write to source data storage 61 is held until the present data is copied to data storage 62, and the bit of bit map 90 for that grain has been set to "1".

Still referring to FIG. 6, in a further embodiment, the mirroring control merges the first flashcopy map 90 with the future flashcopy map 91 to generate a new first flashcopy map 90, and resets the future flashcopy map 91, adding the indication of the grain whose data is to be synchronously copied as the data is written to that grain of source data storage 61; the beginning of a new first cyclic incremental flashcopy comprising a consistency point, and the process is repeated as the data of the grain is copied to the first intermediate data storage 62 and the second intermediate data storage. The commit to the consistency point including the data to be synchronously mirrored comprises the "command complete" for mirroring.

In the examples of FIGS. 3, 4, 5 and 6, data storage 61 and data storage 62 have been discussed. In the case of copying data from grains of source data storage 61 of FIG. 2A to first intermediate data storage 62 with a first incremental flashcopy 70, or of source data storage 61 of FIG. 2C with a first cyclic incremental flashcopy 80, the data is synchronously mirrored to the second intermediate data storage 63, and the bit map 90 represents the state of both the first intermediate data storage 62 and the second intermediate data storage 63. In the case of copying data from grains of the second intermediate data storage 63 of FIG. 2B or of FIG. 2C to target data storage 64 with a second incremental flashcopy 73 of FIG. 2B or with a second cyclic incremental flashcopy 83 of FIG. 2C, the bit map 90 represents the state of the target data storage 64. Similarly, the future bit map 91 of the mirroring controller 28 with respect to first data storage system 24 represents the state of source data storage 61 with respect to updates from a host system, and another future bit map 91 of the mirroring controller 48 with respect to second data storage system 44 of FIG. 1 represents the state of the synchronously mirrored first intermediate data storage 62 and the second intermediate data storage 63 with respect to updates from source data storage 61 of FIGS. 2A, 2B and 2C.

Figure 7:
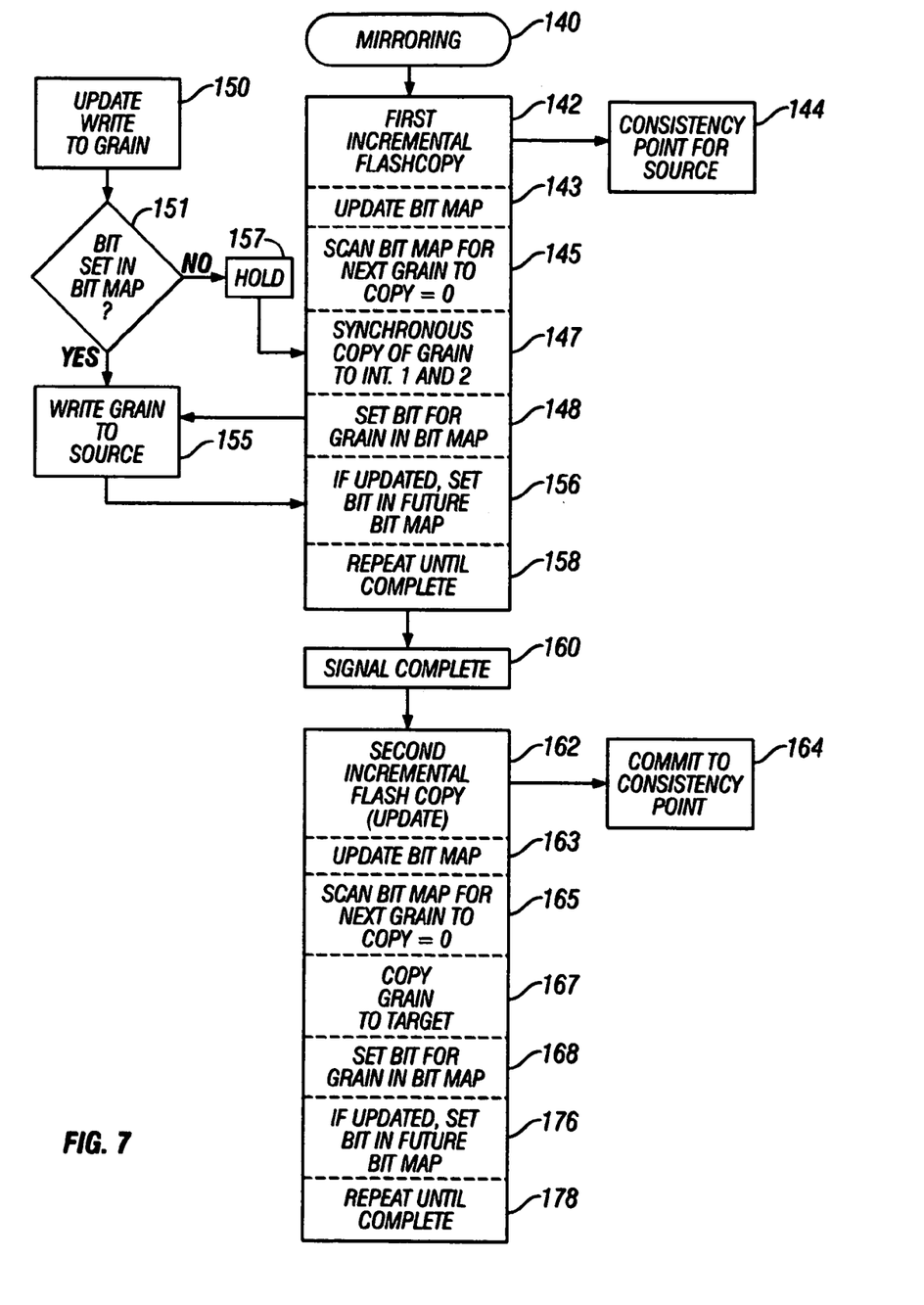
FIG. 7 is a flow chart depicting mirroring in accordance with an embodiment of the present invention.

FIG. 7 depicts an embodiment a computer processor implemented method in accordance with the present invention. Mirroring, whether initial or cyclic, begins at step 140.

A first incremental flashcopy is conducted in step 142, comprising a number of substeps. In substep 143, the bit map 90 of FIGS. 3, 4, 5 or 6 is updated as discussed above. The bit map is updated to identify the grains that need to be mirrored from the source data storage 61 to the target data storage 64 of FIG. 2A or of FIG. 2C. The data to be mirrored becomes the consistency point 144 of the source data storage. In substep 145 of FIG. 7, the bit map is scanned to determine the next grain to copy, for example, by the bit map indicating a "0" for that grain. The scan may be in any suitable order, or, in the case of a COW, may be only for the data required to be copied for the COW. In substep 147, the grain determined to be copied is copied to the first intermediate data storage 62 and synchronously mirrored to the second intermediate data storage 63 of FIG. 2A or of FIG. 2C. In substep 148 of FIG. 7, the bit for that grain is set to "1" to indicate that the grain has been copied.

Step 150 indicates a command to update or modify the data of a grain with an update write, as discussed above. In step 151, a check is made of the bit map 90 of FIGS. 3, 4, 5 or 6 to determine if the data of the source data storage 61 to be overwritten by the update write is present at the synchronously mirrored first intermediate data storage 62 and the second intermediate data storage 63. If so, in step 155 of FIG. 7, the mirroring control allows the update write to be written to the source data storage, and indicates the update write in the future flashcopy map 91 of FIGS. 3, 4, 5 or 6; else, in one embodiment, in substep 145 of FIG. 7, the mirroring control identifies the grain having the data to be overwritten as a grain to be immediately copied. In substep 147, the present data of the grain of the source data storage to be overwritten is copied to the first intermediate data storage and synchronously mirrored to the second intermediate data storage, and, sets the bit for that grain to "1" to indicate that the grain has been copied in substep 148. Then, the mirroring control allows the update write to be written to the source data storage in step 155, and, in step 156, indicates the update write in the future flashcopy map 91 of FIGS. 3, 4, 5 or 6. Alternatively, if the present data of the grain has not been copied to the first intermediate data storage and synchronously mirrored to the second intermediate data storage, the update write of step 150 is held in step 157 until completion of substeps 147 and 148 for the present data of the grain. The synchronous copying of step 147 may be conducted in a normal order, or alternatively may be conducted as a "COW" as discussed above. Step 158 of FIG. 7 represents a loop to repeat the process until all of the data of the grains of the consistency point of step 144 have been copied to the first intermediate data storage 62 and synchronously mirrored to the second intermediate data storage of FIGS. 3, 4, 5 or 6.

When all of the data has been synchronously mirrored, the mirroring is signaled as complete in step 160 of FIG. 7.

A second incremental flashcopy is conducted in step 162. The beginning of the second cyclic incremental flashcopy comprising commit of the consistency point, and the commit is communicated to the controller 28 of the first data storage system 24 of FIGS. 3, 4, 5 or 6 in step 164 of FIG. 7. Step 162 comprises a number of substeps, which are substantially similar to that of step 142, discussed above. In substep 163, the bit map 90 of FIGS. 3, 4, 5 or 6 is updated in accordance with the data to be transferred from the second intermediate data storage 63 to the target data storage 64 of FIG. 2B or 2C, as discussed above. In one example, the transfer of data represented by the previous consistency point has been transferred to the target data storage such that the transfer is complete. If so, the new data to be transferred becomes the entry to the bit map. Alternatively, if the new consistency point is provided before the previous data transfer to the target data storage 64 has been completed, the content of the previous bit map 90 at the time of the new consistency point is merged with the bits representing the new consistency point. In substep 165 of FIG. 7, the bit map is scanned to determine the next grain to copy, for example, by the bit map indicating a "0" for that grain. The scan may be in any suitable order, and, in one example, may comprise the oldest uncopied data in a first in, first out scheme. In substep 167, the grain determined to be copied is copied from the second intermediate data storage 63 of FIG. 2B or of FIG. 2C to the target data storage 64, completing the mirroring of that data grain. In substep 168 of FIG. 7, the bit for that grain is set to "1" to indicate that the grain has been copied.

If data for a grain for a future consistency point is supplied to second intermediate data storage 63 of FIG. 2C, after the data of the original consistency point for that grain has been copied to the target data storage 64, such that the mirroring of that grain is complete, step 176 of FIG. 7 comprises an update write for a future flashcopy map 91 of FIGS. 3, 4, 5 or 6 for the second incremental flashcopy of FIG. 2C.

Step 178 of FIG. 7 represents a loop to repeat the process until all of the data of the grains of the consistency point of step 144 have been copied to the target data storage 64 of FIGS. 3, 4, 5 or 6. As discussed above, step 162 of FIG. 7 does not require completion to begin a new consistency point.

Figure 8:
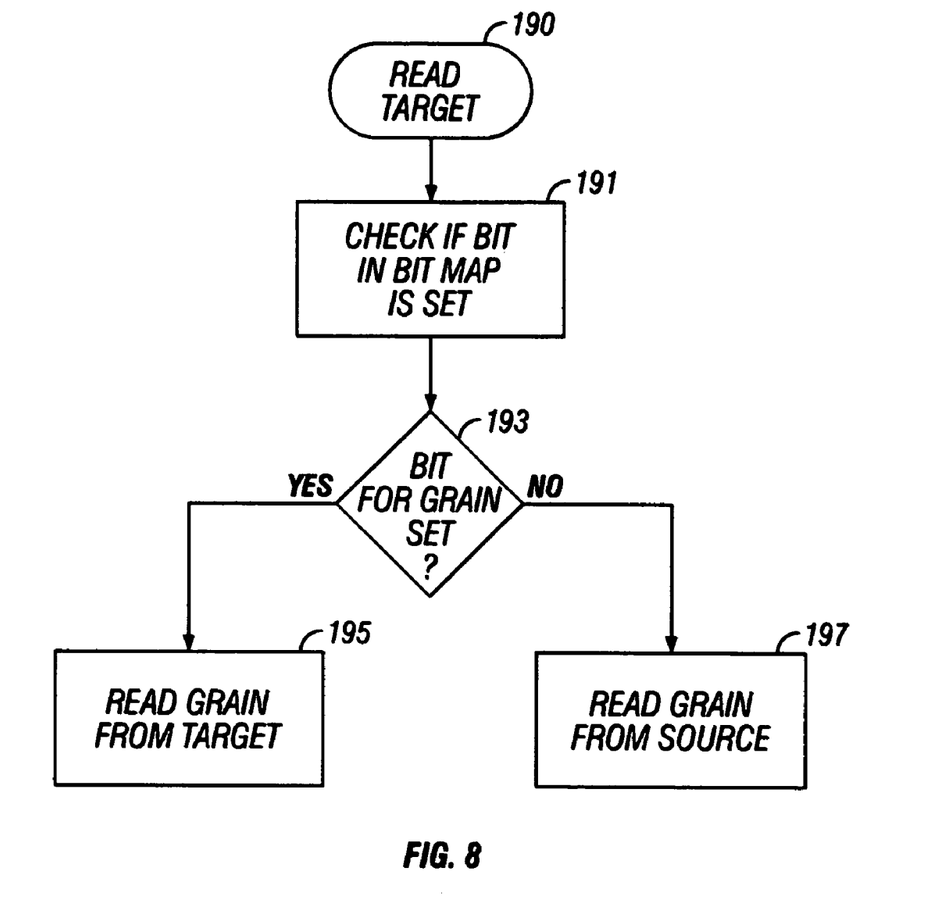
FIG. 8 is a flow chart depicting reading data in accordance with an embodiment of the present invention.

Referring to FIG. 8, a read operation for reading the mirrored data from the second data storage system 44 of FIGS. 1 and 2C, for example, for disaster recovery, is begun at step 190. In step 191, the bit position for the data grain for incremental flashcopy 83 is checked to determine whether the data of the grain representing the latest committed consistency point has been copied to the target data storage. In step 193, the bit of the bit map is read. For example, referring to FIG. 6, if the data of grain 121 is to be read, bit position 116 of bit map 90 indicates that the data of grain 121 of target data storage 64 is the most recent. Thus, in step 195 of FIG. 8, the data is read from grain 121 of FIG. 6. If, instead, the data of grain 123 is to be read, bit position 118 of bit map 90 indicates that the most recent data has not been copied and is at grain 113 of second intermediate data storage 63, and is to be read from the second intermediate data storage, since it was committed. Thus, in step 197 of FIG. 8, the data is read from grain 113 of FIG. 6 of second intermediate data storage 63.

The illustrated components of the information handling system(s) of FIG. 1 and of FIGS. 2A, 2B and 2C, and the arrangement of the bit maps and data grains of FIGS. 3, 4, 5 or 6 may be varied, combined, or combined functions may be separated, as is known to those of skill in the art. The illustrated steps of FIGS. 7 and 8 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An information handling system for mirroring data, comprising:
    source data storage configured to store and update data;
    first intermediate data storage configured to store data, said first intermediate data storage associated with said source data storage;
    target data storage configured to store data;
    second intermediate data storage configured to store data, said second intermediate data storage associated with said target data storage; and
    mirroring control configured to conduct first cyclic incremental flashcopy of said source data storage, the beginning of each said first cyclic incremental flashcopy comprising a consistency point, said first cyclic incremental flashcopy copied to said first intermediate data storage and synchronously mirrored to said second intermediate data storage; and to conduct a second cyclic incremental flashcopy of said second intermediate data storage to said target data storage, said second cyclic incremental flashcopy beginning in response to completion of said first cyclic incremental flashcopy; the beginning of said second cyclic incremental flashcopy comprising commit of said consistency point; wherein said mirroring control additionally comprises a loop representing said commit of said consistency point, initiating another first cyclic incremental flashcopy of said source data storage in response to said commit of said consistency point; wherein said mirroring control additionally is configured to respond to an update write for said source data storage, to determine whether data of said source data storage to be overwritten by said update write is present at said first intermediate data storage and said second intermediate data storage; if so, to allow said update write to be written to said source data storage, and to indicate said update write in a future flashcopy map.

2. The information handling system of claim 1, wherein said mirroring control is configured to employ said future flashcopy map for conducting the next first cyclic incremental flashcopy of said source data storage.

3. The information handling system of claim 2, wherein said mirroring control is configured to conduct said first cyclic incremental flashcopy employing a first flashcopy map indicating required, and not completed, mirroring of grains of said source data storage, and, said mirroring control is configured to, in response to completion of mirroring of said grains indicated by said commit of said consistency point, update said first flashcopy map with said future flashcopy map.

4. The information handling system of claim 2, wherein said mirroring control is configured to conduct said first cyclic incremental flashcopy employing a first flashcopy map indicating required, and not completed, mirroring of grains of said source data storage, and, said mirroring control is configured to merge said first flashcopy map with said future flashcopy map to generate a new first flashcopy map, and resets said future flashcopy map; the beginning of a new first cyclic incremental flashcopy comprising a consistency point.

5. The information handling system of claim 1, wherein said target data storage and said second intermediate data storage are remotely located with respect to locally located said source data storage and said first intermediate data storage; and additionally comprising at least one interface at said target data storage and said second intermediate data storage; and at least one interface at said source data storage and said first intermediate data storage; said interfaces configured to interface with communication systems for communicating between said remote and local locations.

6. An information handling system for providing data for mirroring a source data storage to a target data storage, comprising:

said source data storage configured to store and update data;

first intermediate data storage configured to store data, said first intermediate data storage associated with said source data storage; and mirroring control configured to conduct first cyclic incremental flashcopy of said source data storage, the beginning of each said first cyclic incremental flashcopy comprising a consistency point, said first cyclic incremental flashcopy copied to said first intermediate data storage and synchronously mirrored to said second intermediate data storage for storing data, said second intermediate data storage associated with said target data storage; and a loop configured to initiate another first cyclic incremental flashcopy of said source data storage in response to a commit of said consistency point; wherein said commit of said consistency point comprises the beginning of a second cyclic incremental flashcopy of said second intermediate data storage to said target data storage, said second cyclic incremental flashcopy beginning in response to completion of said first cyclic incremental flashcopy;

wherein said mirroring control additionally is configured to respond to an update write for said source data storage, to determine whether data of said source data storage to be overwritten by said update write is present at said first intermediate data storage and said second intermediate data storage; if so, to allow said update write to be written to said source data storage, and to indicate said update write in a future flashcopy map.

7. The information handling system of claim 6, wherein said mirroring control is configured to employ said future flashcopy map for conducting the next first cyclic incremental flashcopy of said source data storage.

8. The information handling system of claim 7, wherein said first cyclic incremental flashcopy conducted by said mirroring control employs a first flashcopy map indicating required, and not completed, mirroring of grains of said source data storage, and said mirroring control is configured to, in response to completion of mirroring of said grains indicated by said commit of said consistency point, update said first flashcopy map with said future flashcopy map.

9. The information handling system of claim 7, wherein said mirroring control is configured to conduct said first cyclic incremental flashcopy employing a first flashcopy map indicating required, and not completed, mirroring of grains of said source data storage, and, said mirroring control is configured to merge said first flashcopy map with said future flashcopy map to generate a new first flashcopy map, and reset said future flashcopy map; the beginning of a new first cyclic incremental flashcopy comprising a consistency point.

10. The information handling system of claim 6, wherein said target data storage and said second intermediate data storage are remotely located with respect to locally located said source data storage and said first intermediate data storage; and additionally comprising at least one interface at said target data storage and said second intermediate data storage configured to interface said mirroring control and said source data storage with at least one communication system for communicating between said remote and local locations.

11. A method for mirroring data of updatable source data storage to target data storage, said source data storage for storing and updating data, comprising the steps of:

conducting first cyclic incremental flashcopy of said source data storage, the beginning of each said first cyclic incremental flashcopy comprising a consistency point;

said first cyclic incremental flashcopy copied to a first intermediate data storage and synchronously mirrored to a second intermediate data storage;

a loop initiating another first cyclic incremental flashcopy of said source data storage in response to a commit of said consistency point; wherein said commit of said consistency point comprises the beginning of a second cyclic incremental flashcopy of said second intermediate data storage to said target data storage, said second cyclic incremental flashcopy beginning in response to completion of said first cyclic incremental flashcopy; and in response to an update write for said source data storage, determining whether data of said source storage to be overwritten by said update write is present at said synchronously mirrored first intermediate data storage and said second intermediate data storage;

if so, allowing said update write to be written to said source data storage, and indicating said update write in a future flashcopy map.

12. The method of claim 11, wherein said future flashcopy map is employed in said step of conducting a first cyclic incremental flashcopy for the next first cyclic incremental flashcopy of said source data storage.

13. The method of claim 12, wherein said first cyclic incremental flashcopy step employs a first flashcopy map indicating required, and not completed, mirroring of grains of said source data storage, and additionally comprises the step of, in response to completion of mirroring of said grains indicated by said commit of said consistency point, updating said first flashcopy map with said future flashcopy map; to thereby employ said updated first flashcopy map in said step of conducting a first cyclic incremental flashcopy for the next first cyclic incremental flashcopy of said source data storage.

14. The method of claim 12, wherein said first cyclic incremental flashcopy step employs a first flashcopy map indicating required, and not completed, mirroring of grains of said source data storage, and additionally comprises the step of merging said first flashcopy map with said future flashcopy map to generate a new first flashcopy map, and resetting said future flashcopy map; the beginning of a new first cyclic incremental flashcopy comprising a consistency point.

15. A computer program product usable with at least one programmable computer processor having computer readable code embodied therein, said at least one programmable computer processor for controlling mirroring data of updatable source data storage to target data storage, said computer program product comprising:

computer readable program code causing said at least one programmable computer processor to conduct first cyclic incremental flashcopy of said source data storage, the beginning of each said first cyclic incremental flashcopy comprising a consistency point; said first cyclic incremental flashcopy copied to a first intermediate data storage and synchronously mirrored to a second intermediate data storage; and computer readable program code causing said at least one programmable computer processor to conduct a loop initiating another first cyclic incremental flashcopy of said source data storage in response to a commit of said consistency point; wherein said commit of said consistency point comprises the beginning of a second cyclic incremental flashcopy of said second intermediate data storage to said target data storage, said second cyclic incremental flashcopy beginning in response to completion of said first cyclic incremental flashcopy; and computer readable program code causing said at least one programmable computer processor to, in response to an update write for said source data storage, determine whether data of said source data storage to be overwritten by said update write is present at said synchronously mirrored first intermediate data storage and said second intermediate data storage;

if so, allow said update write to be written to said source data storage, and indicate said update write in a future flashcopy map.

16. The computer program product of claim 15, wherein said computer readable program code causing said at least one programmable computer processor to conduct said first cyclic incremental flashcopy of said data storage, employs said future flashcopy map for conducting said first cyclic incremental flashcopy for the next first cyclic incremental flashcopy of said source data storage.

17. The computer program product of claim 16, wherein said computer readable program code causing said at least one programmable computer processor to conduct said first cyclic incremental flashcopy of said data storage, employs a first flashcopy map indicating required, and not completed, mirroring of grains of said source data storage; and said computer program product additionally comprising computer readable program code causing said at least one programmable computer processor to, in response to completion of mirroring of said grains indicated by said commit of said consistency point, update said first flashcopy map with said future flashcopy map; to thereby employ said updated first flashcopy map in said step of conducting a first cyclic incremental flashcopy for the next first cyclic incremental flashcopy of said source data storage.

18. The computer program product of claim 16, wherein said computer readable program code causing said at least one programmable computer processor to conduct said first cyclic incremental flashcopy of said data storage, employs a first flashcopy map indicating required, and not completed, mirroring of grains of said source data storage; and said computer program product additionally comprising computer readable program code causing said at least one programmable computer processor to merge said first flashcopy map with said future flashcopy map to generate a new first flashcopy map, and reset said future flashcopy map; the beginning of a new first cyclic incremental flashcopy comprising a consistency point.

19. A mirroring controller configured to control mirroring data of updatable source data storage to target data storage, said source data storage for storing and updating data; said mirroring controller comprising:

mirroring control configured to conduct first cyclic incremental flashcopy of said source data storage, the beginning of each said first cyclic incremental flashcopy comprising a consistency point, said first cyclic incremental flashcopy copied to a first intermediate data storage for storing data; and synchronously mirrored to a second intermediate data storage for storing data; and, to conduct a loop initiating another first cyclic incremental flashcopy of said source data storage in response to a commit of said consistency point; wherein said commit of said consistency point comprises the beginning of a second cyclic incremental flashcopy of said second intermediate data storage to said target data storage, said second cyclic incremental flashcopy beginning in response to completion of said first cyclic incremental flashcopy; wherein said mirroring control additionally is configured to respond to an update write for said source data storage, determining whether data of said source data storage to be overwritten by said update write is present at said first intermediate data storage and said second intermediate data storage; if so, allowing said update write to be written to said source data storage, and indicating said update write in a future flashcopy map.

20. The mirroring controller of claim 19, wherein said mirroring control is configured to employ said future flashcopy map for conducting the next first cyclic incremental flashcopy of said source data storage.

21. The mirroring controller of claim 20, wherein said mirroring control is configured to conduct said first cyclic incremental flashcopy employing a first flashcopy map indicating required, and not completed, mirroring of grains of said source date storage, and, said mirroring control is configured to, in response to completion of mirroring of said grains indicated by said commit of said consistency point, update said first flashcopy map with said future flashcopy map.

22. The mirroring controller of claim 20, wherein said mirroring control is configured to conduct said first cyclic incremental flashcopy employing a first flashcopy map indicating required, and not completed, mirroring of grains of said source data storage, and, said mirroring control is configured to merge said first flashcopy map with said future flashcopy map to generate a new first flashcopy map, and reset said future flashcopy map; the beginning of a new first cyclic incremental flashcopy comprising a consistency point.

* * * * *